(12) United States Patent
Wu et al.

(10) Patent No.: US 8,884,937 B2
(45) Date of Patent: Nov. 11, 2014

(54) PROJECTION APPARATUS AND PROJECTION METHOD

(75) Inventors: Chia-Lin Wu, Tainan (TW); Sheng-Jen Hsiao, Tainan (TW)

(73) Assignee: Himax Display, Inc., Tainan (TW)

( * ) Notice: Subject to any disclaimer, the term of this patent is extended or adjusted under 35 U.S.C. 154(b) by 158 days.

(21) Appl. No.: 13/346,420

(22) Filed: Jan. 9, 2012

(65) Prior Publication Data

US 2013/0176347 A1 Jul. 11, 2013

(51) Int. Cl.
*G09G 5/00* (2006.01)

(52) U.S. Cl.
USPC ............... 345/204; 345/87; 345/693; 353/70; 348/744

(58) Field of Classification Search
USPC .................. 345/204, 690; 353/69, 70, 87; 348/744–746, 806, 580, 581
See application file for complete search history.

(56) References Cited

U.S. PATENT DOCUMENTS

| 7,537,350 | B2 * | 5/2009 | Kobayashi et al. | 353/69 |
| 7,959,301 | B2 * | 6/2011 | Mihara et al. | 353/70 |
| 2004/0041985 | A1 * | 3/2004 | Kimura et al. | 353/70 |
| 2005/0073661 | A1 * | 4/2005 | Tamura | 353/70 |
| 2011/0175940 | A1 * | 7/2011 | Terauchi et al. | 345/690 |

* cited by examiner

*Primary Examiner* — Jennifer Nguyen
(74) *Attorney, Agent, or Firm* — J.C. Patents

(57) ABSTRACT

A projection apparatus including an image panel, a projection lens, and a control unit is provided. The image panel is configured to provide an image beam and has a displaying area. The projection lens is configured to project the image beam to form an image. When the optical axis of the projection lens is tilted with respect to a normal of the image, the control unit commands a first portion of the displaying area to show a compressed frame corresponding to the image and commands a second portion of the displaying area to show a black border. A projection method is also provided.

13 Claims, 5 Drawing Sheets

PROJECTION APPARATUS AND PROJECTION METHOD

BACKGROUND OF THE INVENTION

1. Field of the Invention

The invention generally relates to a display apparatus and a display method and, in particular, to a projection apparatus and a projection method.

2. Description of Related Art

In recent years, many kinds of displays, for example, liquid crystal displays (LCDs), plasma display panels (PDPs), organic light-emitting diode (OLED) displays, field emission displays (FEDs), and projection apparatus, are developed to replace conventional cathode ray tubes (CRTs). For most kinds of displays, the size of the displaying area of a display depends on the volume of the display. However, a projection apparatus with a relative small volume is capable of projecting an image frame with a large area. Therefore, the projection apparatus has its own advantage and is hard to be replaced.

When the projection apparatus projects an image frame onto a screen and when the optical axis of the lens of the projection apparatus is not perpendicular to the screen, the image frame on the screen has a keystone distortion and the height of the image frame is lengthened, which decreases the quality of the image frame. The keystone distortion of the image frame can be calibrated optically or electronically. However, an optical keystone calibration increases the cost of the projection apparatus, and the conventional electronic keystone calibration is complicated and thus also increases the cost of the projection apparatus.

SUMMARY OF THE INVENTION

Accordingly, the invention is directed to a projection apparatus, which provides good image quality and the cost of which is reduced.

The invention is directed to a projection method, which provides good image quality by a relatively simple way.

An embodiment of the invention provides a projection apparatus including an image panel, a projection lens, and a control unit. The image panel is configured to provide an image beam and has a displaying area, wherein the displaying area has a horizontal direction and a vertical direction perpendicular to the horizontal direction. The projection lens is disposed on a transmission path of the image beam and has an optical axis. The projection lens is configured to project the image beam to form an image. The control unit is coupled to the image panel. When the optical axis is tilted with respect to a normal of the image, the control unit commands a first portion of the displaying area to show a compressed frame corresponding to the image and commands a second portion of the displaying area to show a black border. The compressed frame is compressed along the vertical direction in a compressed ratio relative to a tilt angle of the optical axis with respect to the normal of the image, and the compressed frame and the black border are arranged along the vertical direction.

Another embodiment of the invention provides a projection method including following steps. An image panel is provided. An image beam from the image panel is projected to form an image by a projection lens, wherein the projection lens has an optical axis. When the optical axis is tilted with respect to a normal of the image, a first portion of a displaying area of the image panel is commanded to show a compressed frame corresponding to the image and a second portion of the displaying area is commanded to show a black border. The compressed frame is compressed along a vertical direction of the displaying area in a compressed ratio relative to a tilt angle of the optical axis with respect to the normal of the image, and the compressed frame and the black border are arranged along the vertical direction.

In the projection apparatus and projection method according to the embodiments of the invention, since the first portion of the displaying area shows the compressed frame, the second portion of the displaying area shows the black border, and the compressed ratio is relative to the tilt angle of the optical axis with respect to the normal of the image, therefore good image quality is achieved by a relatively simple way, and the cost of the projection apparatus is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
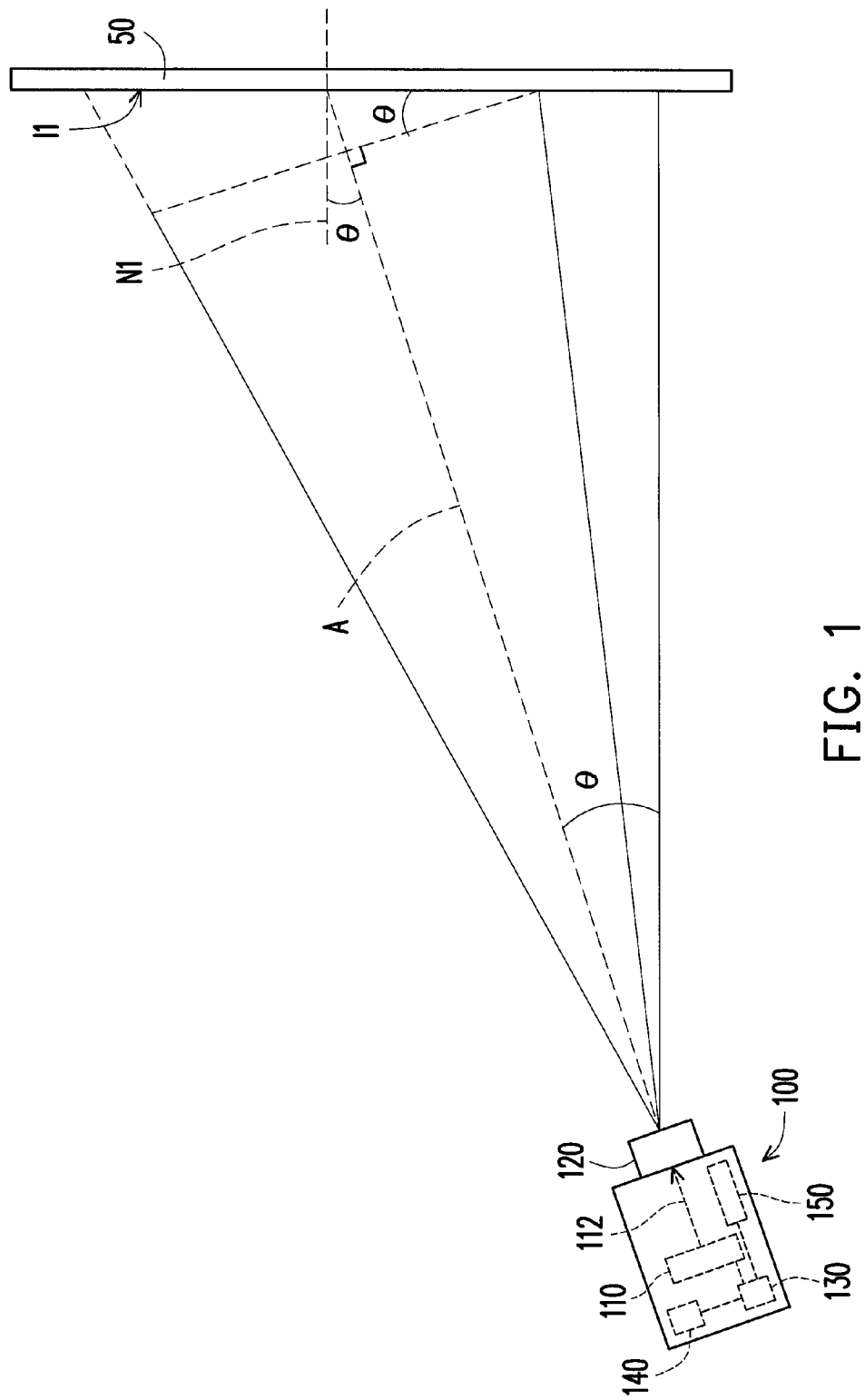
FIG. 1 is a schematic view showing a projection apparatus according to an embodiment of the invention which projects an image beam onto a screen.

Reference will now be made in detail to the present embodiments of the invention, examples of which are illustrated in the accompanying drawings. Wherever possible, the same reference numbers are used in the drawings and the description to refer to the same or like parts.

Figure 2A:
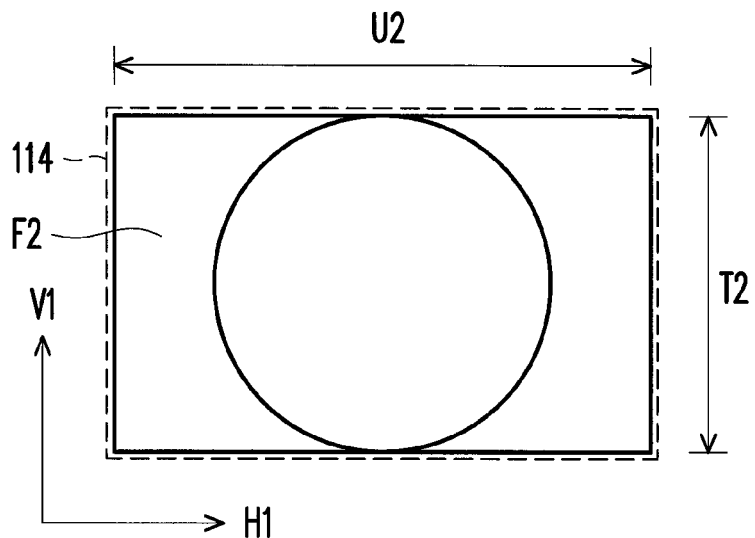
FIGS. 2A through 2C are schematic views showing hypothetical frames on the image panel in FIG. 1.
Figure 2B:
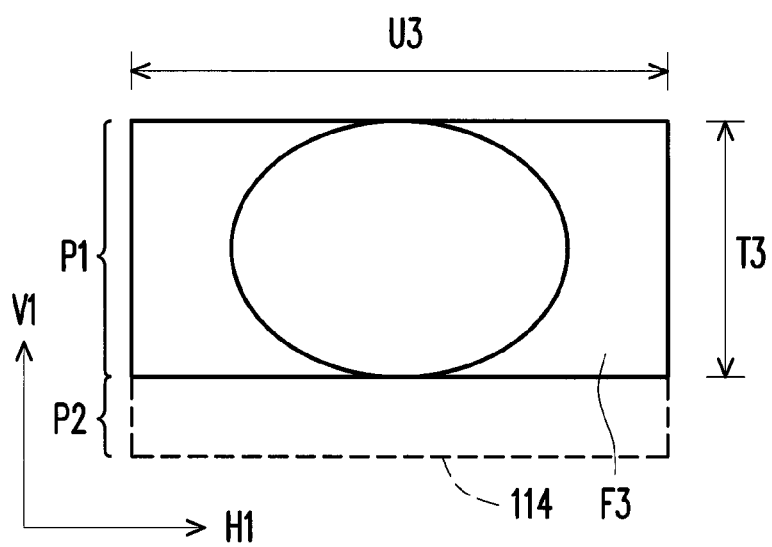
Figure 2C:
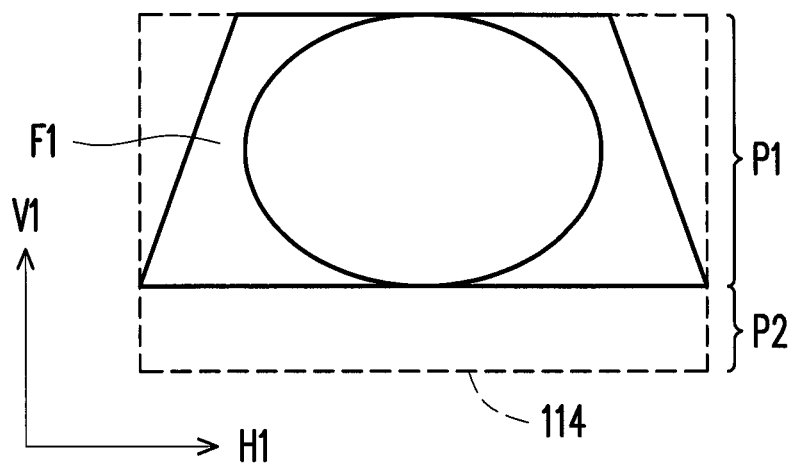
Figure 2D:
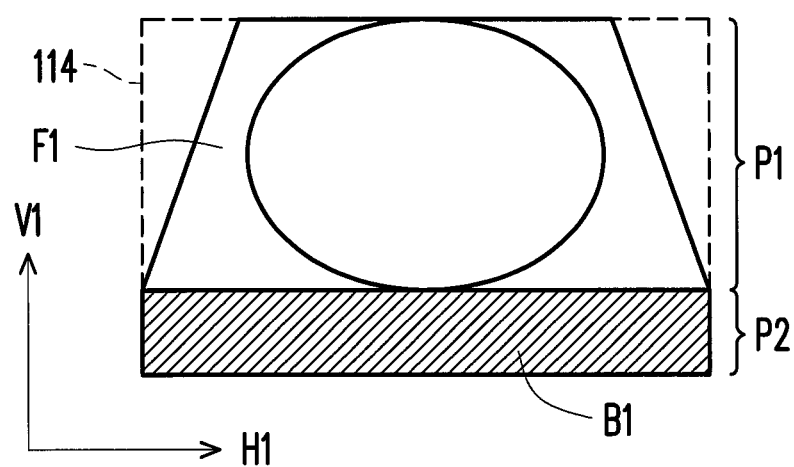
FIG. 2D is a schematic view showing a real frame on the image panel in FIG. 1.
Figure 2E:
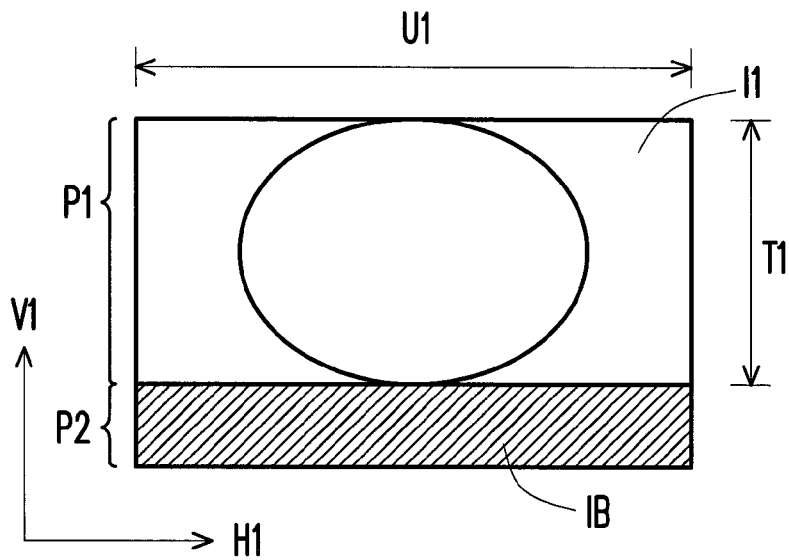
FIG. 2E is a schematic view showing a frame on the screen in FIG. 1.

FIG. 1 is a schematic view showing a projection apparatus according to an embodiment of the invention which projects an image beam onto a screen. FIGS. 2A through 2C are schematic views showing hypothetical frames on the image panel in FIG. 1, FIG. 2D is a schematic view showing a real frame on the image panel in FIG. 1, and FIG. 2E is a schematic view showing a frame on the screen in FIG. 1. Referring to FIG. 1 and FIGS. 2A through 2E, a projection apparatus 100 in this embodiment includes an image panel 110, a projection lens 120, and a control unit 130. The image panel 110 is configured to provide an image beam 112 and has a displaying area 114 (referring to FIG. 2A). In this embodiment, the image panel 110 is, for example, a liquid crystal on silicon (LCOS), a digital micro-mirror device (DMD), a transmissive liquid crystal panel, or another spatial light modulator (SLM). The displaying area 114 has a horizontal direction H1 and a vertical direction V1 perpendicular to the horizontal direction H1. The projection lens 120 is disposed on a transmission path of the image beam 112 and has an optical axis A1. The projection lens 120 is configured to project the image beam 112 to form an image I1 (referring to FIG. 2E). For example, the projection lens 120 projects the image beam 112 onto a screen 50 to form the image I1 on the screen 50. The control unit 130 is coupled to the image panel 110. In this embodiment, the control unit 130 is a control circuit, for example, a control integrated circuit (IC).

When the optical axis A1 is tilted with respect to a normal N1 of the image I1, the control unit 130 commands a first portion P1 of the displaying area 114 to show a compressed frame F1 corresponding to the image I1 and commands a second portion P2 of the displaying area 114 to show a black border B1. The compressed frame F1 is compressed along the vertical direction V1 in a compressed ratio relative to a tilt angle θ of the optical axis A1 with respect to the normal N1 of the image I1 (i.e. the normal of the screen 50), and the compressed frame F1 and the black border B1 are arranged along the vertical direction V1.

In this embodiment, the image panel 110 receives an image signal corresponding to the image I1, and the compressed frame F1 is compressed from a whole frame F2 represented by the image signal. In detail, if a frame F2 is displayed by the image panel 110 according to the image signal without electrical correction of the control unit 130, the frame F2 is not compressed in the horizontal direction H1 or the vertical direction V1, so that the frame F2 occupies the whole displaying area 114. Moreover, if a compressed frame F3 is compressed along the vertical direction V1 in the compressed ratio relative to the tilt angle θ of the optical axis A1 with respect to the normal N1 of the image I1, the height T3 of the compressed frame F3 is substantially equal to the height T2 of the frame F2 multiplied by the compressed ratio. In this embodiment, the compressed ratio is substantially equal to cos θ, and θ is the tilted angle θ of the optical axis A1 with respect to the normal N1 of the image I1. This frame compression is a vertical keystone correction.

In addition, if a compressed frame F1 is compressed along the horizontal direction H1 from the compressed frame F3, the compressed frame F1 is trapezoid-shaped as shown in FIG. 2C. This frame compression is a horizontal keystone correction. Furthermore, the frame shown in FIG. 2D is a real frame displayed by the image panel 110 which includes the compressed frame F1 and the black border B1. When the compressed frame F1 and the black border B1 are projected onto the screen 50, the image I1 is transformed from the trapezoid shape of the compressed frame F1 to a rectangular shaped due to keystone effect, i.e., due to the optical axis A1 being tilted with respect to the normal N1 of the image I1. Moreover, the ratio of the width U1 to the height T1 of the image I1 is decreased from a larger ratio of the width U3 to the height T3 of the compressed frame F3 to a smaller ratio equal to the ratio of the width U2 to the height T2 of the frame F2 corresponding to the image signal. That is to say, the aspect ratio of the image I1 on the screen 50 is not distorted and substantially equal to the aspect ratio of the original image signal, and the shape of the image I1 is rectangular-shaped and not distorted. Besides, the image IB formed from the black border B1 is also black and thus not observed by a user. As a result, the projection apparatus 100 of this embodiment is capable of providing images with good quality.

In the projection apparatus 100 according to this embodiment, since the first portion P1 of the displaying area 114 shows the compressed frame F1, the second portion P2 of the displaying area 114 shows the black border B1, and the compressed ratio is relative to the tilt angle θ of the optical axis A1 with respect to the normal N1 of the image I1, therefore good image quality is achieved by a relatively simple way, and the cost of the projection apparatus 100 is thus reduced.

In this embodiment, the projection apparatus 100 further includes a gravity sensor 140 coupled to the control unit 130. The gravity sensor (g-sensor) 140 detects a direction of the optical axis A1 with respect to gravity, and the control unit 130 determines the tilted angle θ of the optical axis A1 with respect to the normal N1 of the image I1 according to the direction of the optical axis A1. Alternatively, in another embodiment, the gravity sensor 140 may be replaced by a gyroscope coupled to the control unit 130. The gyroscope detects a direction of the optical axis A1 with respect to gravity, and the control unit determines the tilted angle θ of the optical axis A1 with respect to the normal N1 of the image I1 according to the direction of the optical axis A1.

In this embodiment, the projection apparatus 100 further includes a user interface 150 coupled to the control unit 130. When the user interface 150 receives an instruction from a user, the control unit 130 adjusts the compressed ratio in response to the instruction. As a result, the user can adjust the image I1 to a non-distorted shape through the user interface 150.

Figure 3:
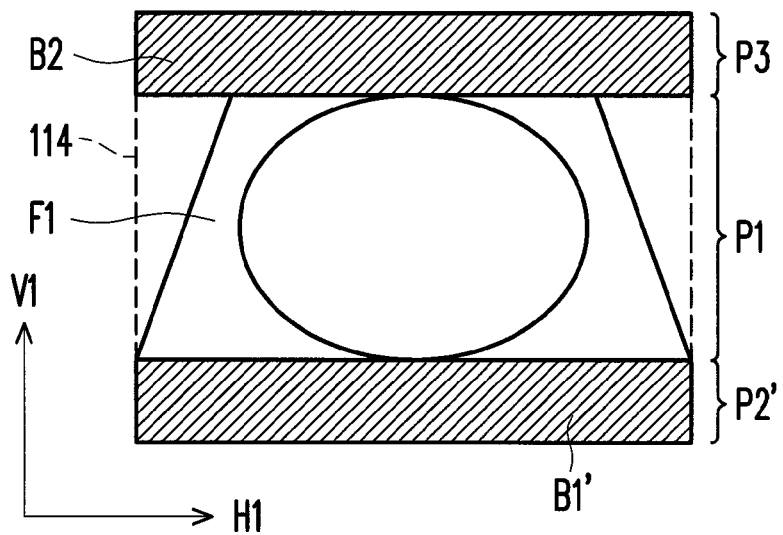
FIG. 3 is a schematic view showing a real frame on an image panel of a projection apparatus according to another embodiment of the invention.

FIG. 3 is a schematic view showing a real frame on an image panel of a projection apparatus according to another embodiment of the invention. Referring to FIG. 3, the projection apparatus of this embodiment is similar to the projection apparatus 100 in FIG. 1, and the difference therebetween is as follows. A control unit of the projection apparatus in this embodiment commands a third portion P3 of the displaying area 114 to show another black border B2, and the third portion P3 is opposite to a second portion P2'. That is to say, the second portion P2' and the third portion P3 of the displaying area 114 are respectively disposed on two opposite sides of the first portion P1 of the displaying area 114, and a black border B1' and the black border B2 are respectively disposed on two opposite sides of the compressed frame F1. As a result, the images formed from the black borders B1' and B2 on the screen 50 are respectively located on two opposite sides of the image I1.

Figure 4:
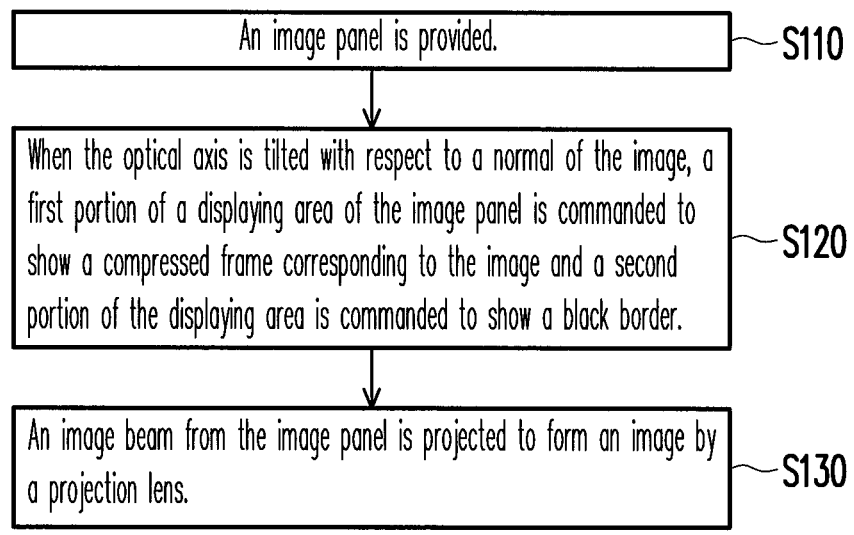
FIG. 4 is a flow chart of a projection method according to an embodiment of the invention.

FIG. 4 is a flow chart of a projection method according to an embodiment of the invention. Referring to FIGS. 1, 2D, and 4, a projection method in this embodiment can be applied to the projection apparatus 100 in FIG. 1. The projection method includes following steps. First, referring to step S110, the image panel 110 is provided. Then, referring to step S120, when the optical axis A1 is tilted with respect to the normal N1 of the image I1, the first portion P1 of the displaying area 114 of the image panel 110 is commanded to show the compressed frame F1 corresponding to the image I1 and the second portion P2 of the displaying area 114 is commanded to show the black border B1. In this embodiment, the first portion P1 of the displaying area 114 and the second portion P2 of the displaying area 114 are commanded by the control unit 130. Referring to step S130, the image beam 112 from the image panel 110 is projected to form the image I1 by the projection lens 120. Other details of the projection method in this embodiment may be referred to the above embodiments and are not repeated herein.

In the projection method of this embodiment, since the first portion P1 of the displaying area 114 shows the compressed frame F1, the second portion P2 of the displaying area 114 shows the black border B1, and the compressed ratio is relative to the tilt angle θ of the optical axis A1 with respect to the normal N1 of the image I1, therefore good image quality is achieved by a relatively simple way, and the cost of the projection apparatus 100 is reduced.

Referring to FIG. 3, in another embodiment, a projection method is applied to the projection apparatus of FIG. 3, and the projection method includes commanding the third portion P3 of the displaying area 114 to show another black border B2, and the third portion P3 is opposite to the second portion P2'.

In the projection apparatus and projection method according to the embodiments of the invention, since the first portion of the displaying area shows the compressed frame, the second portion of the displaying area shows the black border, and the compressed ratio is relative to the tilt angle of the optical axis with respect to the normal of the image, therefore good image quality is achieved by a relatively simple way, and the cost of the projection apparatus is reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection apparatus comprising:
    an image panel configured to provide an image beam and having a displaying area, wherein the displaying area is a range that the image beam projects on and the displaying area has a horizontal direction and a vertical direction perpendicular to the horizontal direction;
    a projection lens disposed on a transmission path of the image beam and having an optical axis, wherein the projection is configured to project the image beam to form an image; and
    a control unit coupled to the image panel, wherein when the optical axis is tilted with respect to a normal of the image, the control unit commands a first portion of the displaying area to show a compressed frame corresponding to the image and commands a second portion of the displaying area to show a black border, the compressed frame is compressed along the vertical direction in a compressed ratio relative to a tilt angle of the optical axis with respect to the normal of the image, the compressed frame and the black border are arranged along the vertical direction, and a center of the displaying area keeps static when the control unit commands.

2. The projection apparatus according to claim 1, wherein the compressed ratio is substantially equal to cos θ, and θ is the tilted angle of the optical axis with respect to the normal of the image.

3. The projection apparatus according to claim 1, wherein the control unit commands a third portion of the displaying area to show another black border, and the third portion is opposite to the second portion.

4. The projection apparatus according to claim 1 further comprising a gravity sensor coupled to the control unit, wherein the gravity sensor detects a direction of the optical axis with respect to gravity, and the control unit determines the tilted angle of the optical axis with respect to the normal of the image according to the direction of the optical axis.

5. The projection apparatus according to claim 1 further comprising a gyroscope coupled to the control unit, wherein the gyroscope detects a direction of the optical axis with respect to gravity, and the control unit determines the tilted angle of the optical axis with respect to the normal of the image according to the direction of the optical axis.

6. The projection apparatus according to claim 1 further comprising a user interface coupled to the control unit, wherein when the user interface receives an instruction from a user, the control unit adjusts the compressed ratio in response to the instruction.

7. The projection apparatus according to claim 1, wherein the image panel receives an image signal corresponding to the image, and the compressed frame is compressed from a whole frame represented by the image signal.

8. A projection method comprising:
    providing an image panel;
    projecting an image beam from the image panel to form an image by a projection lens, wherein the projection lens has an optical axis;
    when the optical axis is tilted with respect to a normal of the image, commanding a first portion of a displaying area of the image panel to show a compressed frame corresponding to the image and commanding a second portion of the displaying area to show a black border, wherein the displaying area is a range that the image beam projects on, the compressed frame is compressed along a vertical direction of the displaying area in a compressed ratio relative to a tilt angle of the optical axis with respect to the normal of the image, the compressed frame and the black border are arranged along the vertical direction, and a center of the displaying area keeps static when the control unit commands.

9. The projection method according to claim 8, wherein the compressed ratio is substantially equal to cos θ, and θ is the tilted angle of the optical axis with respect to the normal of the image.

10. The projection method according to claim 8 further comprising commanding a third portion of the displaying area to show another black border, and the third portion is opposite to the second portion.

11. The projection method according to claim 8 further comprising:
    detecting a direction of the optical axis with respect to gravity; and
    determining the tilted angle of the optical axis with respect to the normal of the image according to the direction of the optical axis.

12. The projection method according to claim 8 further comprising:
    receiving an instruction from a user; and
    adjusting the compressed ratio in response to the instruction.

13. The projection method according to claim 8 further comprising:
    receiving an image signal corresponding to the image; and
    compressing the compressed frame from a whole frame represented by the image signal.

* * * * *